United States Patent [19]

Iizuka

[11] 4,348,091
[45] Sep. 7, 1982

[54] INDICATOR DEVICE IN AN INVERTED GALILEAN FINDER

[75] Inventor: Yutaka Iizuka, Tokyo, Japan

[73] Assignee: Nippon Kogaku K.K., Tokyo, Japan

[21] Appl. No.: 266,469

[22] Filed: May 22, 1981

[30] Foreign Application Priority Data

Jun. 3, 1980 [JP] Japan .................................. 55-74538

[51] Int. Cl.³ ...................... G03B 13/06; G03B 17/20
[52] U.S. Cl. .................................... 354/225; 354/289
[58] Field of Search ................................... 354/53–55, 354/219, 224, 225, 289

[56] References Cited

FOREIGN PATENT DOCUMENTS 1281260 10/1968 Fed. Rep. of Germany ...... 354/224
547045 8/1942 United Kingdom .................. 354/54

Primary Examiner—John Gonzales

Attorney, Agent, or Firm—Fitzpatrick, Cella, Harper & Scinto

[57] ABSTRACT

In an inverted Galilean finder barrel having a divergent objective lens and a convergent eyepiece lens, an indicator device for effecting visual indication within an observation view field comprises indicating means including indicating elements and disposed on the inner side surface of the barrel between the objective lens and the eyepiece lens, a first reflecting optical system having a reflecting surface capable of receiving the light beam from the indicating means and provided at a position opposed to the indicating means on the inner side surface of the barrel, and a second reflecting optical system having an obliquely disposed reflecting surface for reflecting toward the eyepiece lens the light beam from the indicating means reflected by the first reflecting optical system and disposed at a position opposed to the reflecting surface of the first reflecting optical system.

6 Claims, 2 Drawing Figures

4,348,091

INDICATOR DEVICE IN AN INVERTED GALILEAN FINDER

BACKGROUND OF THE INVENTION

1. Field of the Invention

This invention relates to an indicator device in an inverted Galilean finder having a divergent objective lens and a convergent eyepiece lens.

2. Description of the Prior Art

The prior art indicator device for indicating information within an inverted Galilean finder has been designed such that numbers or symbols such as photographing distance scale divisions, shutter speeds or the like marked on the phototaking lens barrel are indicated directly within the finder view field through an objective lens and an eyepiece lens or that small light sources of various colors disposed around the finder are turned on and off and the turn-on-and-off of the small light sources are directly sensed by an eye whereby information is transmitted.

In such device of the prior art, it is preferable that, for making the entire camera compact, an indicating member for indicating various types of photographing information electrically processed in the camera body be disposed on the side surface of the barrel containing a finder optical system therein or at a position in the camera body which faces said side surface to introduce the indicated information into the barrel, but in such case, it has been difficult to effect clear indication within the finder view field and particularly, it has been a great problem to make the visibility of an observed object and the visibilities of various indications coincident with each other within the finder view field.

The adjustment of the visibility of such an indicating member disposed very closely adjacent to the finder can be tentatively achieved by providing in the light path of the indicating member an optical member having an intense converging action, but the provision of such optical member would necessarily lead to a deteriorated imaging performance and therefore, it has been very difficult to effect clear indication within the finder even in a compact camera.

SUMMARY OF THE INVENTION

It is an object of the present invention to solve these problems in an inverted Galilean finder and to provide an indicator device which enables an indicating member disposed near the wall surface of the finder barrel to be clearly observed within the finder with the same visibility as that of an object to be photographed.

The indicator device in the inverted Galilean finder according to the present invention includes a first reflecting member provided laterally of the finder light path opposed to an indicating member provided laterally of the finder light path between the objective lens and the eyepiece lens to direct the light rays from the indicating member into the finder view field, and a second reflecting member obliquely disposed with respect to the finder light path near the indicating member to reflect toward the eyepiece lens the light rays from the indicating member reflected by the first reflecting member.

The invention will become more fully apparent from the following detailed description of an embodiment thereof taken in conjunction with the accompanying drawings.

DESCRIPTION OF THE PREFERRED EMBODIMENT

Figure 1:
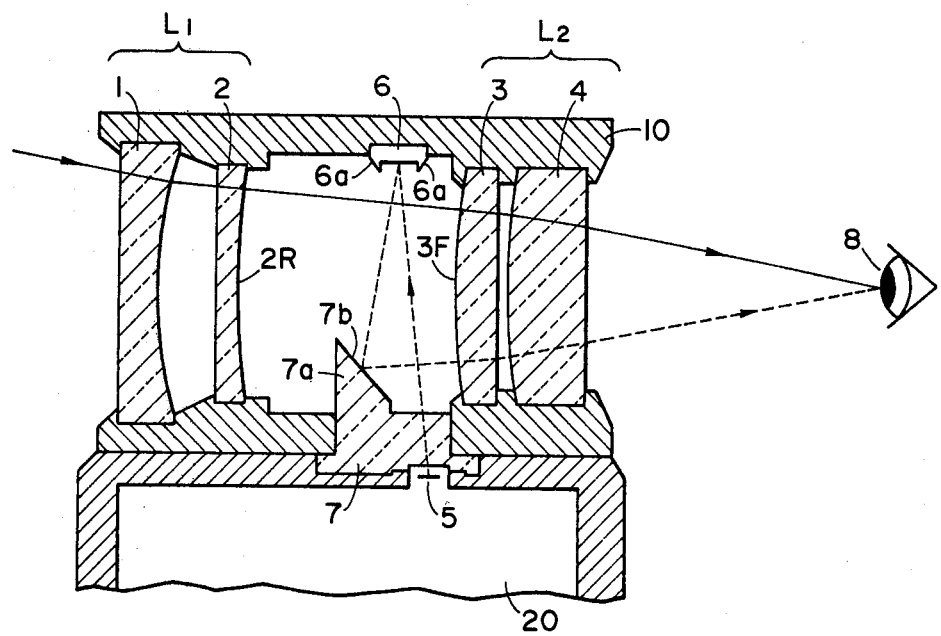
FIG. 1 is a schematic cross-sectional view showing the construction of an embodiment of the present invention.

FIG. 1 is a schematic cross-sectional view showing an embodiment of the present invention. A finder barrel 10 is secured on a camera body 20 having a phototaking lens, an exposure control device, etc., and has an objective lens $L_1$ having divergency and an eyepiece lens $L_2$ having convergency. As shown, the objective lens $L_1$ comprises two negative lenses 1 and 2, and the eyepiece lens $L_2$ comprises two positive lenses 3 and 4, but each of them may also sufficiently comprise a single lens. The light ray from an object to be observed passes through the objective lens $L_1$ and the eyepiece lens $L_2$ to the eye 8 of the observer as indicated by a solid line in FIG. 1.

Indicating elements 5 are provided on the surface of the camera body 20 joined to the finder barrel 10 and is exposed from the body. These indicating elements 5 are light-emitting elements such as LED operatively associated with the exposure control device of the camera and adapted to be turned on or turned on and off to visually effect warning indications such as the propriety of a set exposure and the propriety of the operative association of the exposure meter with the object brightness. The light beam from the indicating elements 5 passes through the light-transmitting window of a block 7 formed of transparent glass or transparent plastic and provided through the wall of the finder barrel between the objective lens $L_1$ and the eyepiece lens $L_2$, crosses the finder light path and arrives at a first reflecting optical system 6 secured to the barrel wall substantially opposed to the indicating elements 5. The block 7 has a triangular projected portion 7a extending between the light-transmitting window and the objective lens $L_1$ and toward the finder light path, and a reflecting surface 7b inclined with respect to the finder light path is formed on the triangular projected portion, thus providing a second reflecting optical system. The light reflected by the first reflecting optical system 6 is reflected by the reflecting surface 7b, crosses said light ray passing from the indicating elements 5 to the first reflecting optical system 6, and passes through the eyepiece lens $L_2$ to the eye 8 of the observer.

The reflecting surface of the first reflecting optical system 6 is formed as a concave mirror of gentle curvature and has a slight converging action. The image of the indicating elements 5 formed by the first reflecting optical system 6 and the reflecting surface 7b as the second reflecting optical system is formed on the same plane as the image of the observed object formed by the objective lens $L_1$, with respect to the eyepiece lens $L_2$, and accordingly, the indicating elements 5 can be clearly observed within the view field with the same visibility as within the observation view field.

Figure 2:
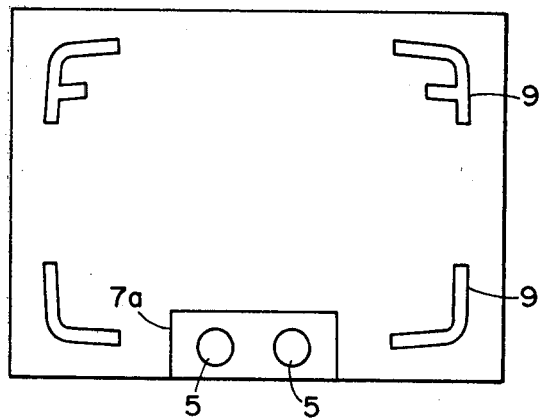
FIG. 2 illustrates the view field within the finder observed in the above embodiment.

FIG. 2 shows the state of the view field within the finder observed in the present embodiment. Within the finder, an Albada type bright frame 9 can be seen through a conventional means not shown in FIG. 1, and the image of the indicating elements 5 fringed by the image of the reflecting surface 7b can be seen in the lower portion of the finder. The number and size of the indicating elements 5 are not restricted to those shown, but may be selected in designing in accordance with the size of the effective surfaces of the first reflecting optical system 6 and the reflecting surface 7b as the second reflecting optical system, and can be indicated in any desired shape at any desired location in the marginal portion of the finder view field.

In the present embodiment, the first reflecting optical system 6 is formed as a concave mirror, whereas it is not restricted thereto but may be formed as a convex mirror or a plane mirror depending on the position thereof relative to the indicating elements 5. That is, the radius of curvature of the reflecting surface of the first reflecting optical system 6 is suitably determined so as to make the visibility of the indicating elements 5 within the finder coincident with the visibility of the observation view field by the finder optical system. Around the reflecting surface of the first reflecting optical system 6, there is formed an annularly projected light-intercepting wall 6a to prevent the light from the objective lens $L_1$ from being reflected by the reflecting surface of the first reflecting optical system and arriving at the eye as a deleterious light. The light-intercepting wall 6a, even if formed only on that side of the reflecting surface which is adjacent to the objective lens, may achieve a practically sufficient light-intercepting effect, but if it is formed as in the present embodiment, a more complete light-intercepting effect will be achieved.

In reflecting the light from the indicating elements 5 and directing it to the eyepiece lens $L_2$, the reflecting surface 7b also performs a function equivalent to that of the first reflecting optical system 6, but the reflecting surface 7b may preferably be planar. This is because the reflecting surface 7b is obliquely disposed and therefore the light ray incident thereon has an angle of incidence of about 45° and if the reflecting surface 7b is formed as a curved surface, astigmatism will be created to impart a deleterious action to the image of the indicating elements. Accordingly, it is desirable that the curvature for adjusting the visibility be provided in the first reflecting optical system 6 on which the light from the indicating elements 5 is incident substantially perpendicularly.

The position of the indicating elements 5 should desirably be as much spaced apart as possible from the front surface 3F of the eyepiece lens $L_2$ or the rear surface 2R of the objective lens $L_1$. This is because the light obliquely emitted from the indicating elements 5 and reflected by the lens surface 3F becomes a ghost image while the light obliquely reflected by the first reflecting optical system 6 and reflected by the lens surface 2R also becomes a ghost image. The annularly formed light-intercepting wall 6a of the reflecting optical system 6 is also useful to eliminate these ghost images.

Further, the transparent block 7 covering the indicating elements 5 has the function of optically coupling but mechanically isolating the interior of the camera body and the finder barrel 10. That is, even when the camera is used under water and the lens of the finder thereof is damaged, the block prevents entry of water into the camera body 20. In the above-described embodiment, the window for transmitting therethrough the light from the indicating elements 5 and the reflecting surface 7b are formed on the single block 7, whereas of course, they may also be provided separately from each other.

I claim:

1. In an inverted Galilean finder barrel having a divergent objective lens and a convergent eyepiece lens, an indicator device for effecting visual indication within an observation view field, said indicator device comprising:
   (a) indicating means including indicating elements and disposed on the inner side surface of said barrel between said objective lens and said eyepiece lens;
   (b) a first reflecting optical system having a reflecting surface capable of receiving the light beam from said indicating means and provided at a position opposed to said indicating means on the inner side surface of said barrel; and
   (c) a second reflecting optical system having an obliquely disposed reflecting surface for reflecting toward said eyepiece lens the light beam from said indicating means reflected by said first reflecting optical system and disposed at a position opposed to the reflecting surface of said first reflecting optical system.

2. An indicator device according to claim 1, wherein said indicating means includes a window capable of transmitting light therethrough and provided through a side wall forming said barrel, and said indicating elements are disposed in proximity to the outside of said window.

3. An indicator device according to claim 2, wherein said barrel is coupled to a camera, and said indicating elements are provided at the coupling portion between said camera and said barrel to indicate information processed by said camera.

4. An indicator device according to claim 2, wherein said indicating means includes a support having a light-transmitting portion fitted in said window and an inclined surface projected into said barrel, and the reflecting surface of said second reflecting optical system is formed on said inclined surface of said support.

5. An indicator device according to claim 1, wherein the reflecting surface of said first reflecting optical system is formed into a concave surface, and the reflecting surface of said second reflecting optical system is formed into a planar surface.

6. An indicator device according to claim 1, wherein said first reflecting optical system includes a light-intercepting wall projected into the interior of said barrel around said reflecting surface including at least the position between said reflecting surface and said objective lens.

* * * * *